United States Patent
Wang et al.

(10) Patent No.: US 11,615,641 B2
(45) Date of Patent: Mar. 28, 2023

(54) FINGERPRINT IDENTIFICATION MODULE, DISPLAY PANEL AND DISPLAY DEVICE

(71) Applicant: BOE Technology Group Co., Ltd., Beijing (CN)

(72) Inventors: Mingdong Wang, Beijing (CN); Xuan Feng, Beijing (CN); Yunke Qin, Beijing (CN); Jiabin Wang, Beijing (CN); Yangbing Li, Beijing (CN); Ping Zhang, Beijing (CN); Lei Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/515,256

(22) Filed: Oct. 29, 2021

(65) Prior Publication Data
US 2022/0188535 A1   Jun. 16, 2022

(30) Foreign Application Priority Data
Dec. 14, 2020   (CN) .......................... 202011470721.0

(51) Int. Cl.
*G06V 40/13* (2022.01)
(52) U.S. Cl.
CPC .................. *G06V 40/1318* (2022.01)

(58) Field of Classification Search
None
See application file for complete search history.

(56) References Cited

U.S. PATENT DOCUMENTS

| 11,017,200 | B1* | 5/2021 | Wickboldt | ............ H04M 1/026 |
| 2022/0115424 | A1* | 4/2022 | Katsuta | ............ H01L 27/14605 |

* cited by examiner

*Primary Examiner* — Joseph R Haley
(74) *Attorney, Agent, or Firm* — IPro, PLLC

(57) ABSTRACT

A fingerprint identification module is provided. The fingerprint identification module includes: a base substrate, a first conductive layer, and a third conductive layer that are laminated sequentially. The first conductive layer includes a first signal line and a second signal line, wherein the first signal line extends along a first direction and is connected to a gate of a reset transistor in a pixel sensing circuit, and the second signal line extends along the first direction and is connected to a gate of a switch transistor in the pixel sensing circuit. The third conductive layer includes a first conductive portion configured to form a first electrode of a photodiode in the pixel sensing circuit, wherein an orthographic projection of the first conductive portion on the base substrate does not overlap with orthographic projections of the first signal line and the second signal line on the base substrate.

19 Claims, 10 Drawing Sheets

FINGERPRINT IDENTIFICATION MODULE, DISPLAY PANEL AND DISPLAY DEVICE

CROSS-REFERENCE TO RELATED APPLICATION

This application claims priority to Chinese Patent Application No. 202011470721.0, filed on Dec. 14, 2020 and entitled "FINGERPRINT IDENTIFICATION MODULE, AND DISPLAY PANEL", the entire contents of which are incorporated herein by reference.

TECHNICAL FIELD

The present disclosure relates to the field of display technologies, and in particular relates to a fingerprint identification module, a display panel, a display panel and a display device.

BACKGROUND

Generally, a fingerprint identification module is integrated in a display panel, and the fingerprint identification module can identity fingerprint images. In the related art, the fingerprint identification module may include an active pixel sensing circuit capable of converting optical signals into electrical signals, such that the fingerprint images are reflected based on the electrical signals.

SUMMARY

In a first aspect of the present disclosure, a fingerprint identification module is provided. The fingerprint identification module includes: a pixel sensing circuit, the pixel sensing circuit including a driver transistor, a reset transistor, a switch transistor and a photodiode, wherein a first electrode of the reset transistor and a first electrode of the photodiode are both connected to a gate of the driver transistor, and a first electrode of the switch transistor is connected to a first electrode of the driver transistor; the fingerprint identification module further including a base substrate, a first conductive layer disposed on a side of the base substrate, and a second conductive layer disposed on a side, distal from the base substrate, of the first conductive layer, wherein the first conductive layer includes: a first signal line, extending along a first direction and connected to a gate of the reset transistor; and a second signal line, extending along the first direction and connected to a gate of the switch transistor, wherein the second signal line and the first signal line are spaced apart along a second direction, the second direction intersecting with the first direction; and the second conductive layer includes: a first conductive portion, wherein the first conductive portion is configured to form the first electrode of the photodiode, an orthographic projection of the first conductive portion on the base substrate does not overlap with an orthographic projection of the first signal line on the base substrate and an orthographic projection of the second signal line on the base substrate, and the orthographic projection of the first conductive portion on the base substrate is between the orthographic projection of the first signal line on the base substrate and the orthographic projection of the second signal line on the base substrate.

In some embodiments, the fingerprint identification module further includes: a third conductive layer disposed between the first conductive layer and the second conductive layer, wherein the third conductive layer includes: a third signal line, extending along the second direction and connected to a second electrode of the reset transistor; and a fourth signal line, extending along the second direction and connected to a second electrode of the driver transistor; wherein the second conductive layer further includes: a fifth signal line, extending along the second direction and connected to a second electrode of the switch transistor.

In some embodiments, an orthographic projection of the fourth signal line on the base substrate is between the orthographic projection of the first conductive portion on the base substrate and an orthographic projection of the third signal line on the base substrate.

In some embodiments, the orthographic projection of the fourth signal line on the base substrate does not overlap with the orthographic projection of the first conductive portion on the base substrate.

In some embodiments, an orthographic projection of the fifth signal line on the base substrate is between the orthographic projection of the third signal line on the base substrate and the orthographic projection of the fourth signal line on the base substrate.

In some embodiments, the fingerprint identification module further includes: an active layer disposed between the base substrate and the first conductive layer, wherein the active layer includes: a first active portion, wherein an orthographic projection of the first active portion on the base substrate is between the orthographic projection of the third signal line on the base substrate and the orthographic projection of the fourth signal line on the base substrate, and a part of the first active portion is configured to form a channel region of the reset transistor; and a second active portion, wherein an orthographic projection of the second active portion on the base substrate is between the orthographic projection of the third signal line on the base substrate and the orthographic projection of the fourth signal line on the base substrate, and a part of the second active portion is configured to form channel regions of the switch transistor and the driver transistor.

In some embodiments, the orthographic projection of the first active portion on the base substrate is between the orthographic projection of the first signal line on the base substrate and the orthographic projection of the second signal line on the base substrate; and the orthographic projection of the second active portion on the base substrate is between the orthographic projection of the first active portion on the base substrate and the orthographic projection of the second signal line on the base substrate.

In some embodiments, both the first active portion and the second active portion extend along the first direction.

In some embodiments, the first active portion includes: a first sub-active portion, configured to form a first channel region of the reset transistor; and a second sub-active portion, configured to form a second channel region of the reset transistor, wherein an orthographic projection of the first sub-active portion on the base substrate and an orthographic projection of the second sub-active portion on the base substrate are spaced apart along the first direction.

In some embodiments, the first conductive layer further includes: a second conductive portion, wherein the second conductive portion is connected to the first signal line, an orthographic projection of the second conductive portion on the base substrate covers the orthographic projection of the first sub-active portion on the base substrate, and the second conductive portion is configured to form a first gate of the reset transistor; and a third conductive portion, wherein the third conductive portion is connected to the first signal line, an orthographic projection of the third conductive portion on the base substrate covers the orthographic projection of the second sub-active portion on the base substrate, and the third conductive portion is configured to form a second gate of the reset transistor.

In some embodiments, the second active portion includes: a third sub-active portion, configured to form a first channel region of the switch transistor; a fourth sub-active portion, configured to form a second channel region of the switch transistor; and a fifth sub-active portion, configured to form the channel region of the driver transistor, wherein an orthographic projection of the third sub-active portion on the base substrate, an orthographic projection of the fourth sub-active portion on the base substrate and an orthographic projection of the fifth sub-active portion on the base substrate are sequentially spaced apart along the first direction; and the orthographic projection of the fifth sub-active portion on the base substrate is between the orthographic projection of the fourth signal line on the base substrate and the orthographic projection of the fourth sub-active portion on the base substrate.

In some embodiments, the first conductive layer further includes: a fourth conductive portion, wherein the fourth conductive portion is connected to the second signal line, an orthographic projection of the fourth conductive portion on the base substrate covers the orthographic projection of the third sub-active portion on the base substrate, and the fourth conductive portion is configured to form a first gate of the switch transistor; and a fifth conductive portion, wherein the fifth conductive portion is connected to the second signal line, an orthographic projection of the fifth conductive portion on the base substrate covers the orthographic projection of the fourth sub-active portion on the base substrate, and the fifth conductive portion is configured to form a second gate of the switch transistor; and a sixth conductive portion, wherein an orthographic projection of the sixth conductive portion on the base substrate covers the orthographic projection of the fifth sub-active portion on the base substrate, and the sixth conductive portion is configured to form the gate of the driver transistor.

In some embodiments, the first active portion further includes: a sixth sub-active portion, wherein an orthographic projection of the sixth sub-active portion on the base substrate is on a side, distal from the orthographic projection of the second sub-active portion on the base substrate, of the orthographic projection of the first sub-active portion on the base substrate; wherein the second conductive layer further includes: a seventh conductive portion, wherein an orthographic projection of the seventh conductive portion on the base substrate is between the orthographic projection of the third signal line on the base substrate and the orthographic projection of the fourth signal line on the base substrate; and the seventh conductive portion is connected to the sixth conductive portion and the sixth sub-active portion through via holes, respectively.

In some embodiments, the second active portion further includes: a seventh sub-active portion, wherein an orthographic projection of the seventh sub-active portion on the base substrate is on a side, distal from the orthographic projection of the fourth sub-active portion on the base substrate, of the orthographic projection of the third sub-active portion on the base substrate; wherein the second conductive layer further includes: an eighth conductive portion, wherein an orthographic projection of the eighth conductive portion on the base substrate at least partially overlaps with the orthographic projection of the seventh sub-active portion on the base substrate, and the eighth conductive portion is connected to the seventh sub-active portion through a via hole; wherein the fifth signal line is connected to the eighth conductive portion through a via hole.

In some embodiments, an area of the orthographic projection of the first conductive portion on the base substrate is 13-16 times an area of the orthographic projection of the sixth conductive portion on the base substrate.

In some embodiments, the first active portion further includes an eighth sub-active portion, wherein an orthographic projection of the eighth sub-active portion on the base substrate is on a side, distal from the orthographic projection of the first sub-active portion on the base substrate, of the orthographic projection of the second sub-active portion on the base substrate, and the third signal line is connected to the eighth sub-active portion through a via hole; and the second active portion further includes a ninth sub-active portion, wherein an orthographic projection of the ninth sub-active portion on the base substrate is on a side, distal from the orthographic projection of the fourth sub-active portion on the base substrate, of the orthographic projection of the fifth sub-active portion on the base substrate, and the fourth signal line is connected to the ninth sub-active portion through a via hole.

In some embodiments, the fingerprint identification module further includes: a fourth conductive layer and a fifth conductive layer, the fourth conductive layer being disposed on a side of the second conductive layer distal from the base substrate, and the fifth conductive layer being disposed on a side of the fourth conductive layer distal from the base substrate, wherein the fourth conductive layer further includes a ninth conductive portion, wherein an orthographic projection of the ninth conductive portion on the base substrate at least partially overlaps with the orthographic projection of the first conductive portion on the base substrate, and the ninth conductive portion is configured to form a second electrode of the photodiode; and the fifth conductive layer includes a sixth signal line, wherein an orthographic projection of the sixth signal line on the base substrate is on a side, distal from the orthographic projection of the fourth signal line on the base substrate, of the orthographic projection of the first conductive portion on the base substrate, and the sixth signal line is connected to the ninth conductive portion through a via hole.

In a second aspect of the present disclosure, a display panel is provided. The display panel includes: a display substrate, and the fingerprint identification module described in the first aspect and disposed on a side of the display substrate.

In some embodiments, the display panel further includes: a base, wherein the fingerprint identification module is disposed on a side of the base; a filter module, disposed on a side, distal from the base, of the fingerprint identification module; and a collimating layer, disposed on a side, distal from the base, of the filter module; wherein the display substrate is disposed on a side, distal from the base, of the collimating layer.

In a third aspect of the present disclosure, a display device is provided. The display device includes: a power supply component and the display panel described in the above aspect. The power supply component is configured to supply power to the display panel.

It should be understood that the foregoing general descriptions and the following detailed descriptions are merely exemplary and explanatory, and are not intended to limit the present disclosure.

BRIEF DESCRIPTION OF THE DRAWINGS

The drawings herein are incorporated in and constitute a part of the specification, showing the embodiments consistent with the present disclosure and explaining the principles of the present disclosure in conjunction with the specification. Apparently, the accompanying drawings in the following descriptions show merely some embodiments of the present disclosure, and a person of ordinary skill in the art may still derive other accompanying drawings from these accompanying drawings without creative efforts.

DETAILED DESCRIPTION

Figure 1:
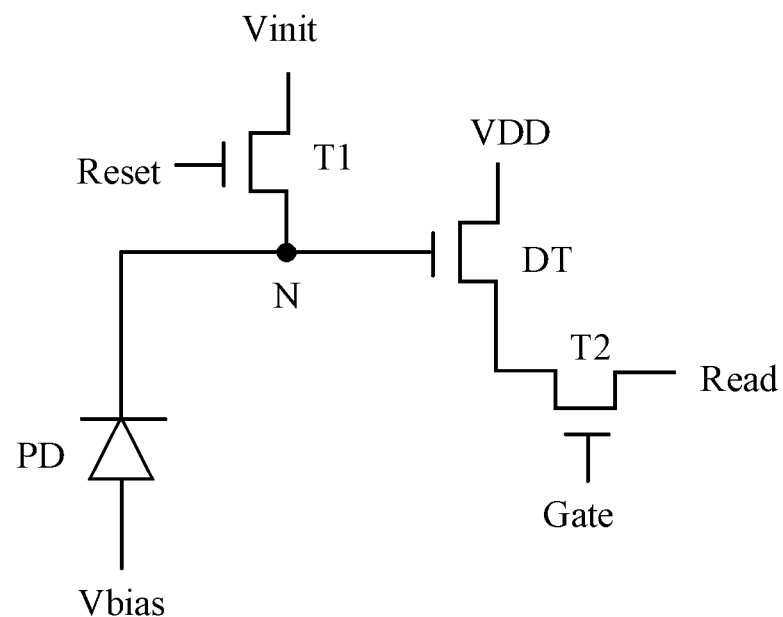
FIG. 1 shows a schematic structural diagram of a pixel sensing circuit according to an exemplary embodiment of the related art.

Exemplary embodiments will now be described more comprehensively with reference to the accompanying drawings. However, the exemplary embodiments may be implemented in various forms, and shall not be understood to be limited to the embodiments set forth herein. On the contrary, these embodiments are provided in order to make the present disclosure more comprehensive and complete, and to convey the concept of exemplary embodiments to those skilled in the art. The same reference signs in the drawings indicate the same or similar structures, and thus detailed descriptions thereof are omitted.

Although relative terms such as "up" and "down" are used in this specification to describe the relative relationship of one component represented by a reference sign to another, these terms are used only for convenience in this specification, for example, based on the direction of the example described in the accompanying drawings. It is to be understood that if the device shown by the reference sign is turned upside down, the component described as being "up" may become the component described as being "down". Other relative terms such as "high", "low", "top", "bottom" "left", "right", etc. shall also be understood to have the similar meanings. When a structure is "on" other structures, it may mean that the structure is integrally formed on other structures, or that the structure is "directly" disposed on other structures, or that the structure is "indirectly" disposed on other structures via another structure.

The terms "a", "one", "the" are used to indicate the existence of one or more elements/components/etc.; and the terms "include" and "have" are used to indicate open-ended inclusion and to mean that additional elements/components/ etc. may exist besides the listed elements/components/etc.

A fingerprint identification module can identify fingerprint images. In the related art, the fingerprint identification module may include a pixel sensing circuit capable of converting optical signals into electrical signals, thereby reflecting the fingerprint image based on the electrical signals. FIG. 1 shows a schematic structural diagram of a pixel sensing circuit according to an exemplary embodiment in the related art. As shown in FIG. 1, the pixel sensing circuit may include a driver transistor DT, a reset transistor T1, a switch transistor T2, and a photodiode PD.

The gate of the driver transistor DT is connected to a node N, the first electrode of the driver transistor DT is connected to the first electrode of the switch transistor T2, and the second electrode of the driver transistor DT is connected to a first power supply terminal VDD. The first electrode of the reset transistor T1 is connected to the node N, the second electrode of the reset transistor T1 is connected to an initial signal terminal Vinit, and the gate of the reset transistor T1 is connected to a reset signal terminal Reset. The second electrode of the switch transistor T2 is connected to the read signal terminal Read, and the gate of the switch transistor T2 is connected to a gate driving signal terminal Gate. The first electrode of the photodiode PD is connected to the node N, and the second electrode of the photodiode PD is connected to a bias voltage terminal Vbias. The driver transistor DT, the reset transistor T1, and the switch transistor T2 may all be N-type transistors.

Figure 2:
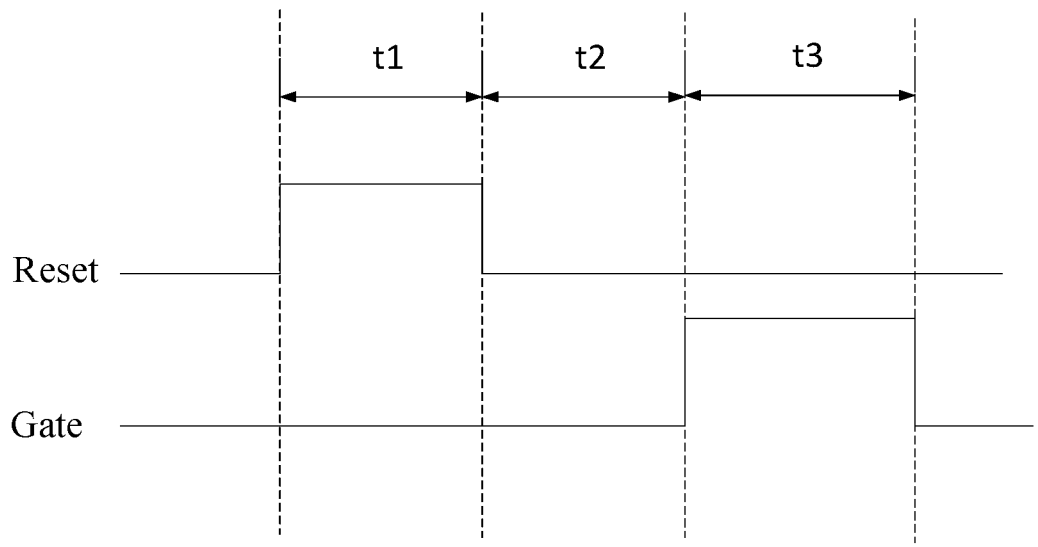
FIG. 2 shows a timing sequence diagram of nodes in a method for driving a pixel sensing circuit according to the related art.

FIG. 2 is a timing sequence diagram of nodes in a method for driving a pixel sensing circuit in the related art. As shown in FIG. 2, the method for driving the pixel sensing circuit may include three phases, that is, a reset phase t1, a sensing phase t2, and a reading phase t3. In the reset phase t1, the reset signal terminal Reset outputs a high level signal, the reset transistor T1 is turned on, and the initial signal terminal Vinit inputs an initial signal to the node N to reset the node N. In the sensing phase t2, the photodiode PD acquires incident light and generates a corresponding electrical signal to charge the node N. In the reading phase t3, the gate driving signal terminal Gate is at a high level, the switch transistor T2 is turned on, and the driver transistor DT outputs current to the read signal terminal Read under the action of the node N.

In the reading phase t3, the driver transistor operates in a saturation region, and the driver transistor DT outputs the current satisfying $I=(\mu W C_{ox}/2L)(V_{gs}-V_{th})^2$, where $\mu$ is the carrier mobility, Cox is the gate capacitance per unit area, W is the width of the channel of the driver transistor DT, L is the length of the channel of the driver transistor DT, Vgs is the gate-source voltage difference of the driver transistor DT, and Vth is the threshold voltage of the driver transistor DT. The image processor can determine the light intensity of the incident light based on the electric signal at the read signal terminal Read.

Figure 3:
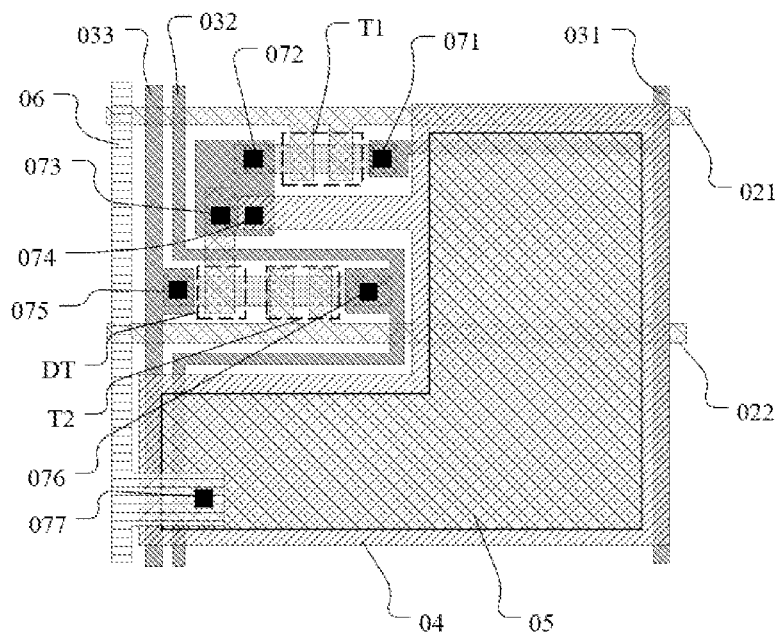
FIG. 3 shows a structural diagram of a fingerprint identification module in the related art.
Figure 4:
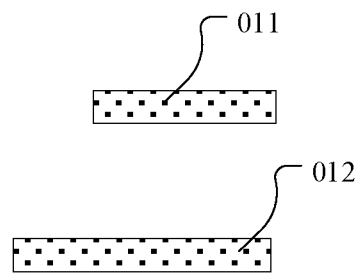
FIG. 4 shows a structural diagram of an active layer in FIG. 3.
Figure 5:
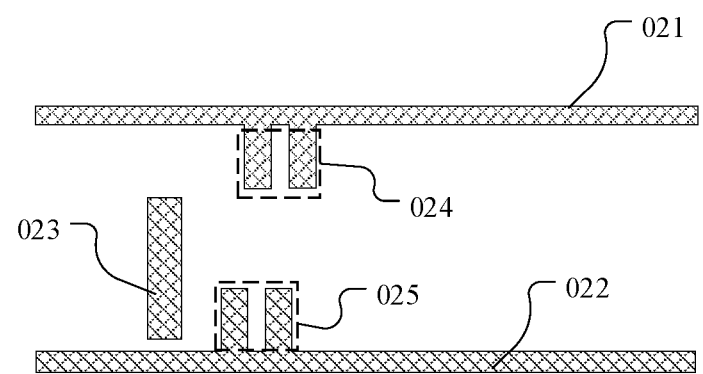
FIG. 5 shows a structural diagram of a first conductive layer in FIG. 3.
Figure 6:
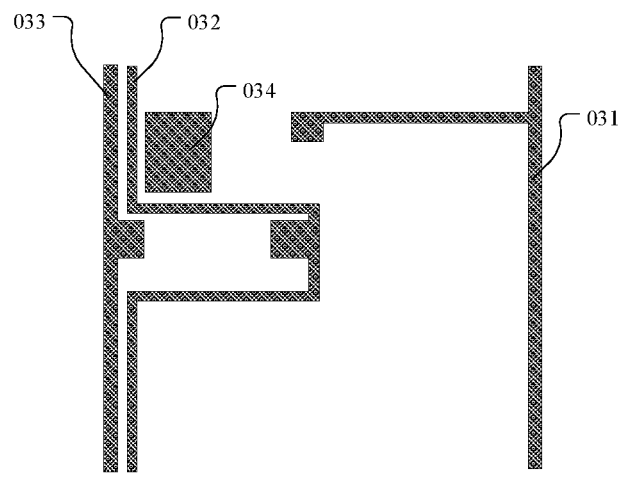
FIG. 6 shows a structural diagram of a third conductive layer in FIG. 3.
Figure 7:
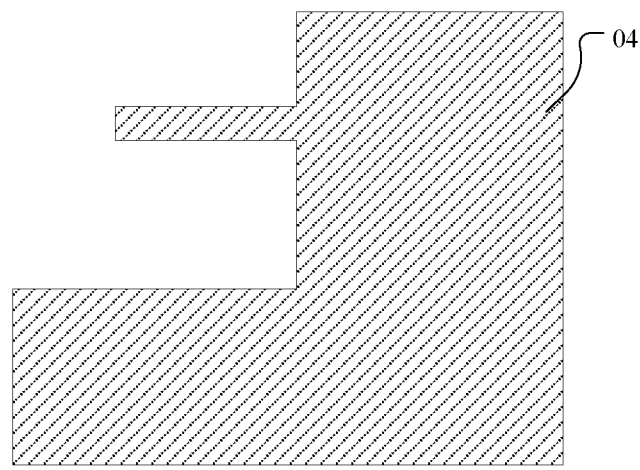
FIG. 7 shows a structural diagram of a second conductive layer in FIG. 3.
Figure 8:
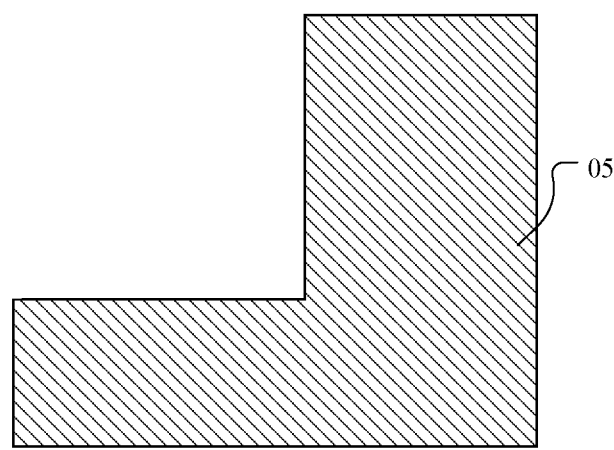
FIG. 8 shows a structural diagram of a fourth conductive layer in FIG. 3.
Figure 9:
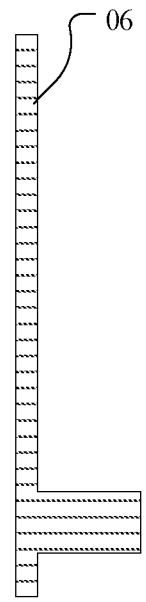
FIG. 9 shows a structural diagram of a fifth conductive layer in FIG. 3.

FIG. 3 shows a structural diagram of a fingerprint identification module in the related art; FIG. 4 shows a structural diagram of an active layer in FIG. 3; FIG. 5 shows a structural diagram of a first conductive layer in FIG. 3; FIG. 6 shows a structural diagram of a third conductive layer in FIG. 3; FIG. 7 shows a structural diagram of a second conductive layer in FIG. 3; FIG. 8 shows a structural diagram of a fourth conductive layer in FIG. 3; and FIG. 9 shows a structural diagram of a fifth conductive layer in FIG. 3. The active layer, the first conductive layer, the third conductive layer, the second conductive layer, the fourth conductive layer, and the fifth conductive layer may be laminated sequentially, and an insulating layer may be provided between adjacent two of the above structural layers. The fingerprint identification module may include the pixel sensing circuit shown in FIG. 1.

As shown in FIG. 3 and FIG. 4, the active layer may include an active portion 011 and an active portion 012. A part of the active portion 011 may be configured to form a channel region of the reset transistor T1, and a part of the active portion 012 may be configured to form a channel region of the switch transistor T2 and a channel region of the driver transistor DT. As shown in FIG. 3 and FIG. 5, the first conductive layer may include a signal line 021, a signal line 022, a conductive portion 023, a conductive portion 024, and a conductive portion 025. The conductive portion 023 may be configured to form the gate of the driver transistor DT; the conductive portion 024 may be configured to form the gate of the reset transistor T1; the conductive portion 025 may be configured to form the gate of the switch transistor T2; the signal line 021 may be configured to form the reset signal terminal Reset in FIG. 1; and the signal line 022 may be configured to form the gate driving signal terminal Gate in FIG. 1.

As shown in FIG. 3 and FIG. 6, the third conductive layer may include a signal line 031, a signal line 032, a signal line 033 and a conductive portion 034. The signal line 031 may be configured to form the initial signal terminal Vinit in FIG. 1; the signal line 032 may be configured to form the read signal terminal Read in FIG. 1; and the signal line 033 may be configured to form the first power supply terminal VDD in FIG. 1. The signal line 031 may be connected to the active portion 011 through a via hole 071, to connect the second electrode of the reset transistor T1 and the initial signal terminal Vinit. The conductive portion 034 may be connected to the active portion 011 through the via hole 072 and connected to the conductive portion 023 through the via hole 073, to connect the first electrode of the reset transistor T1 and the gate of the driver transistor DT. The signal line 033 is connected to the active portion 012 through the via hole 075, to connect the second electrode of the driver transistor DT and the first power supply terminal VDD. The signal line 032 may be connected to the active portion 012 through the via hole 076, to connect the second electrode of the switch transistor T2 and the read signal terminal Read.

As shown in FIG. 3 and FIG. 7, the second conductive layer may include a conductive portion 04. The conductive portion 04 may be configured to form the first electrode of the photodiode PD. The conductive portion 04 is connected to the conductive portion 034 through the via hole 074, to connect the first electrode of the photodiode PD and the gate of the driver transistor DT. As shown in FIG. 3 and FIG. 8, the fourth conductive layer may include a conductive portion 05. The conductive portion 05 may be configured to form the second electrode of the photodiode PD. As shown in FIG. 3 and FIG. 9, the fifth conductive layer may include a signal line 06. The signal line 06 may be configured to form the bias voltage terminal Vbias in FIG. 1, and may be connected to the conductive portion 05 through the via hole 077.

Based on the fingerprint identification module shown in FIG. 3 to FIG. 9, the parasitic capacitance between respective conductive portions in FIG. 3 to FIG. 9 may be calculated by using an electronic design automation (EDA) software. Table 1 shows capacitance values of the parasitic capacitors formed between different conductive portions.

TABLE 1

| Sequence Number | First electrode | Second electrode | Capacitance value |
|---|---|---|---|
| C1  | 021 | 022 | $2.5 \times 10^{-3}$ |
| C2  | 021 | 04  | 9.66 |
| C3  | 021 | 032 | 2.44 |
| C4  | 021 | 031 | 0.308 |
| C5  | 021 | 06  | 0.37 |
| C6  | 021 | 033 | 2.39 |
| C7  | 022 | 04  | 12.6 |
| C8  | 022 | 032 | 3.8 |
| C9  | 022 | 031 | 2.33 |
| C10 | 022 | 06  | 0.269 |
| C11 | 022 | 033 | 2.36 |
| C12 | 04  | 032 | 14.7 |
| C13 | 04  | 031 | 16.9 |
| C14 | 04  | 06  | 8.6 |
| C15 | 04  | 033 | 7.47 |
| C16 | 032 | 031 | $2.88 \times 10^{-4}$ |
| C17 | 032 | 06  | 0.228 |
| C18 | 032 | 033 | 2.78 |
| C19 | 031 | 06  | $1.18 \times 10^{-4}$ |
| C20 | 031 | 033 | $7.26 \times 10^{-5}$ |
| C21 | 06  | 033 | 1.72 |

Figure 10:
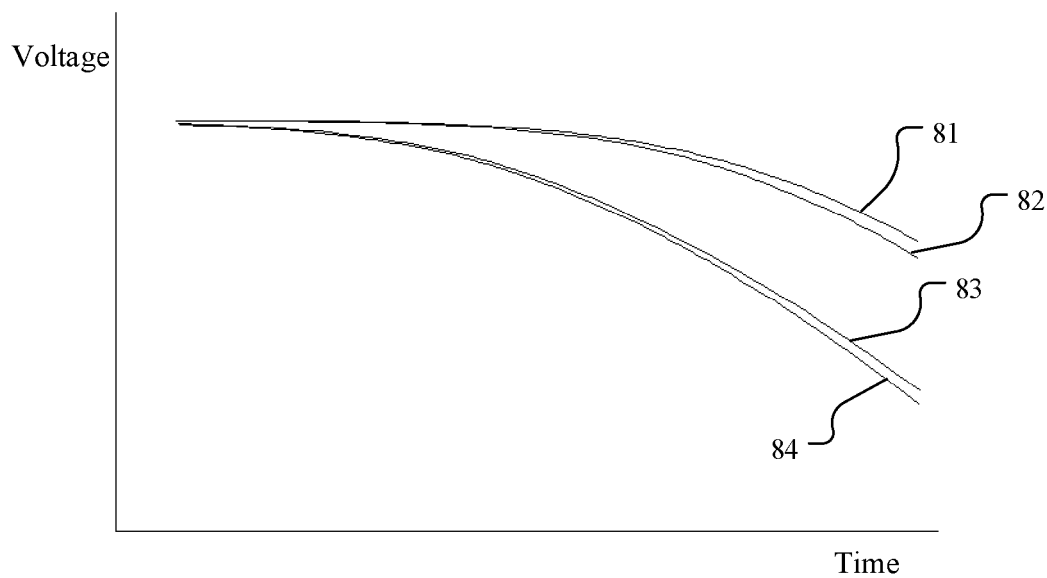
FIG. 10 shows an influence curve showing the effect of a parasitic capacitance on an output voltage of a driver transistor.
Figure 11:
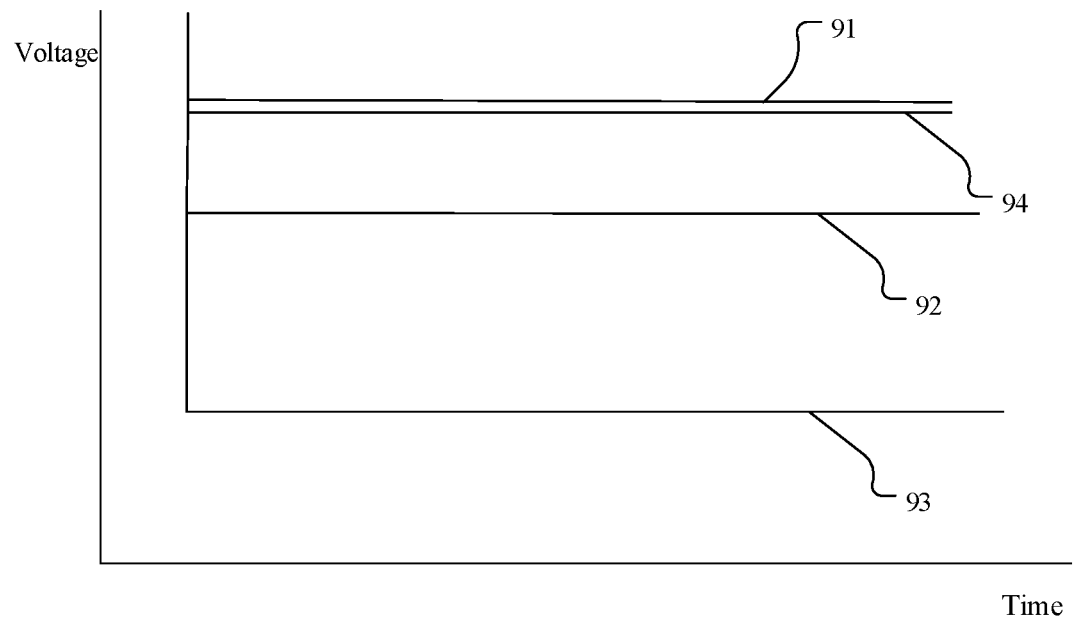
FIG. 11 shows an influence curve showing the effect of a parasitic capacitance on an output voltage of a switch transistor.

Effects of the parasitic capacitance on the output voltage of transistors in the pixels are simulated in this embodiment. As shown in FIG. 10 and FIG. 11, FIG. 10 shows an influence curve showing the effect of the parasitic capacitance on the output voltage of the driver transistor, where the horizontal axis is the system time, and the vertical axis is the simulated value of the output voltage of the driver transistor. FIG. 11 shows an influence curve showing the effect of the parasitic capacitance on the output voltage of the switch transistor, where the horizontal axis is the system time, and the vertical axis is the simulated value of the output voltage of the switch transistor.

As shown in FIG. 10, the curve 82 shows variation of the output voltage of the driver transistor DT over time in the case of no parasitic capacitor; the curve 81 shows variation of the output voltage of the driver transistor DT over time in the case where capacitors other than the capacitor C2 exist; the curve 83 shows variation of the output voltage of the driver transistor DT over time in the case where all parasitic capacitors exist; and the curve 84 shows variation of the output voltage of the driver transistor DT over time in the case where only the capacitor C2 exists. It can be seen from FIG. 10 that the curve of the output voltage of the driver transistor DT drifts from curve 81 toward curve 83 under the presence of capacitor C2, while the curve of the output voltage of the driver transistor DT drifts from curve 84 toward curve 83 under the total effects of the parasitic capacitors other than the capacitor C2. Therefore, the effect of the capacitor C2 on the output voltage of the driver transistor DT has a greater weight than the effect of other parasitic capacitors than the capacitor C2 on the output voltage of the driver transistor. DT As shown in FIG. 11, the curve 92 shows variation of the output voltage of the switch transistor T2 over time in the case where no parasitic capacitor exists; the curve 93 shows variation of the output voltage of the switch transistor T2 over time in the case where capacitors other than the capacitor C7 exist; the curve 91 shows variation of the output voltage of the switch transistor T2 over time in the case where all parasitic capacitors exist; and the curve 94 shows variation of the output voltage of the switch transistor T2 over time in the case where only the capacitor C7 exists. It can be seen from FIG. 11 that the curve of the output voltage of the switch transistor T2 drifts from curve 93 toward curve 91 under the presence of capacitor C7, while the curve of the output voltage of the switch transistor T2 drifts from curve 94 toward curve 91 under the total effects of the parasitic capacitors other than the capacitor C7. Therefore, the effect of the capacitor C7 on the output voltage of the switch transistor T2 has a greater weight than the effect of other parasitic capacitors than the capacitor C7 on the output voltage of the switch transistor T2.

Thus, the parasitic capacitor C2 formed between the signal line 021 and the conductive portion 04 and the parasitic capacitor C7 formed between the signal line 022 and the conductive portion 04 in the related art seriously affects the normal driving of the pixel sensing circuit, which results in big noise during operation of the fingerprint identification module and affects the accuracy of identifying fingerprints of fingerprint identification module.

Figure 12:
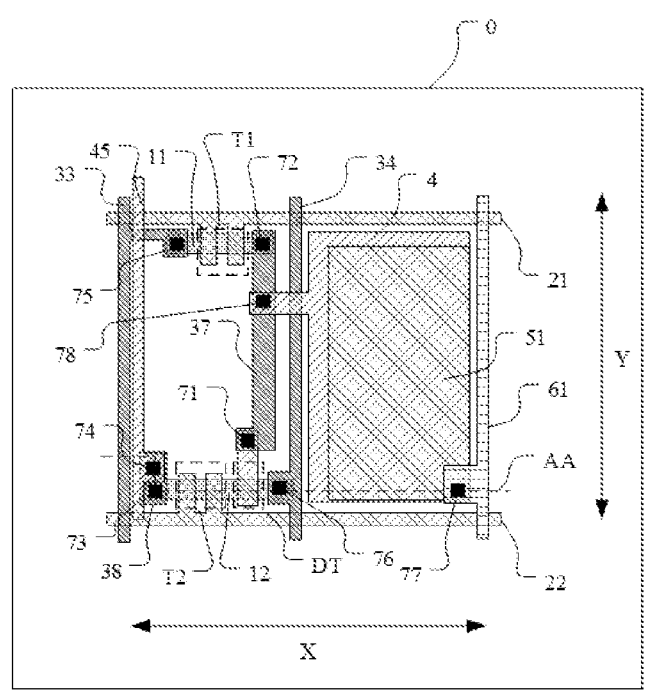
FIG. 12 shows a structural diagram of a fingerprint identification module according to an exemplary embodiment of the present disclosure.
Figure 14:
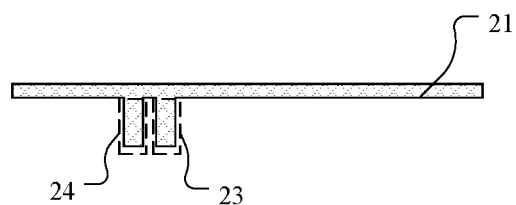
FIG. 14 shows a structural diagram of a first conductive layer in FIG. 12.
Figure 14:
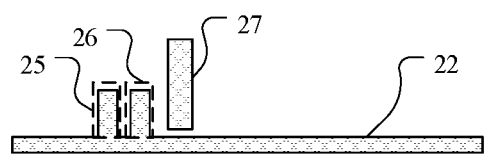
Figure 16:
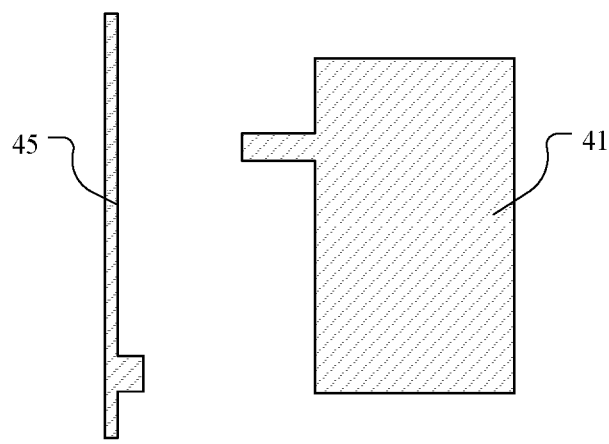
FIG. 16 shows a structural diagram of a second conductive layer in FIG. 12.

Based on this, this exemplary embodiment provides a fingerprint identification module. Referring to FIG. 12, FIG. 14, and FIG. 16, FIG. 12 shows a structural diagram of a fingerprint identification module according to an exemplary embodiment of the present disclosure, FIG. 14 shows a structural diagram of a first conductive layer in FIG. 12, and FIG. 16 shows a structural diagram of a second conductive layer in FIG. 12. The fingerprint identification module includes a pixel sensing circuit. The structure of the pixel sensing circuit may be as shown in FIG. 1.

As shown in FIG. 12, FIG. 14, and FIG. 16, the fingerprint identification module further includes a base substrate 0, a first conductive layer, and a second conductive layer. The first conductive layer is disposed on a side of the base substrate 0, and may include a first signal line 21 and a second signal line 22. The first signal line 21 extends along a first direction X, and the first signal line 21 is connected to the gate of the reset transistor T1. The second signal line 22 on the base substrate extends along the first direction X, and the second signal line 22 is connected to the gate of the switch transistor T2. Here, the signal line extending along the first direction X may refer to that the orthographic projection of the signal line on the base substrate 0 extends along the first direction X.

The orthographic projection of the second signal line 22 on the base substrate 0 may be spaced apart from the orthographic projection of the first signal line 21 on the base substrate 0 along a second direction Y. The first direction X may intersect with the second direction Y. For example, the first direction X may be perpendicular to the second direction Y.

The second conductive layer may be disposed on the side, distal from the base substrate 0, of the first conductive layer, and the second conductive layer may include a first conductive portion 41 configured to form the first electrode of the photodiode PD. An orthographic projection of the first conductive portion 41 on the base substrate 0 may not overlap with the orthographic projection of the first signal line 21 on the base substrate 0 and the orthographic projection of the second signal line 22 on the base substrate 0, and the orthographic projection of the first conductive portion 41 on the base substrate 0 is between the orthographic projection of the first signal line 21 on the base substrate 0 and the orthographic projection of the second signal line 22 on the base substrate 0. The first signal line 21 may be configured to form the reset signal terminal in FIG. 1, and the second signal lines 22 may be configured to form the gate driving signal terminal in FIG. 1.

In the fingerprint identification module according to this exemplary embodiment, the orthographic projection of the first conductive portion 41 on the base substrate 0 does not overlap with the orthographic projection of the first signal line 21 on the base substrate 0 and the orthographic projection of the second signal line 22 on the base substrate, such that the parasitic capacitance between the second signal line 22 and the first conductive portion 41 and the parasitic capacitance between the first signal line 21 and the first conductive portion 41 are reduced, thereby reducing the effects of the parasitic capacitance on the output voltage of the driver transistor and the output voltage of the switch transistor, reducing the noise during the operation of the fingerprint identification module, and improving the accuracy of the fingerprint identification module in fingerprint detection. Furthermore, the orthographic projection of the first conductive portion 41 on the base substrate 0 is disposed between the orthographic projection of the first signal line 21 on the base substrate 0 and the orthographic projection of the second signal line 22 on the base substrate 0, such that the integration of the pixel sensing circuit can be improved.

As shown in FIG. 3 and FIG. 6, in the fingerprint identification module in the related art, the signal line 032 is extended and bent with a plurality of bent right angles. Strong signal reflection easily occurs at the bent right angles, and meanwhile great parasitic capacitance is easily generated between the signal line 032 that is bent and extended and other structures (e.g., the first conductive portion 41).

Figure 15:
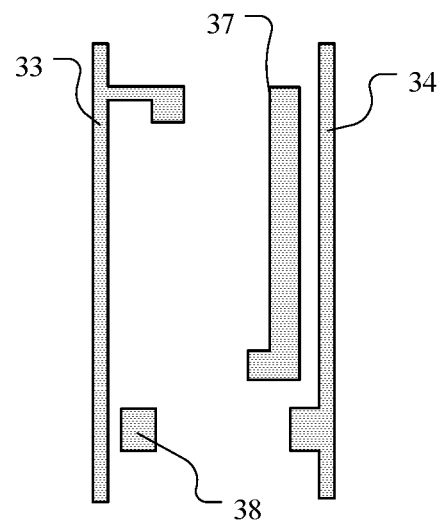
FIG. 15 shows a structural diagram of a third conductive layer in FIG. 12.

In this exemplary embodiment, the fingerprint identification module further includes a third conductive layer, and the third conductive layer is disposed between the first conductive layer and the second conductive layer. FIG. 15 shows a structural diagram of a third conductive layer in FIG. 12. The third conductive layer may include a third signal line 33 and a fourth signal line 34. An orthographic projection of the third signal line 33 on the base substrate 0 extends along the second direction Y, and the third signal line 33 is configured to be connected to the second electrode of the reset transistor T1. An orthographic projection of the fourth signal line 34 on the base substrate 0 extends along the second direction Y, and the fourth signal line 34 is configured to be connected to the second electrode of the driver transistor DT.

As shown in FIG. 12 and FIG. 16, the second conductive layer further includes a fifth signal line 45. An orthographic projection of the fifth signal line 45 on the base substrate extends along the second direction Y, and the fifth signal line 45 is configured to be connected to the second electrode of the switch transistor T2. The third signal line 33 may be configured to form the initial signal terminal Vinit in FIG. 1, the fourth signal line 34 may be configured to form the first power supply terminal VDD in FIG. 1, and the fifth signal line 45 may be configured to form the read signal terminal Read in FIG. 1.

In this exemplary embodiment, the fifth signal line 45 is disposed in the second conductive layer, such that the orthographic projection of the fifth signal line 45 on the base substrate may extend linearly along the second direction Y. Based on this configuration, the signal reflection described above can be reduced on the one hand, and on the other hand, the parasitic capacitance between the fifth signal line 45 and other structures may be reduced. On still another hand, the fifth signal line 45 is disposed in the second conductive layer, which can increase the distance between the fifth signal line 45 and the second signal line 22 in the lamination direction, thereby reducing the parasitic capacitance between the fifth signal line 45 and the second signal line 22, reducing the signal interference between the fifth signal line 45 and the second signal line 22, and improving the performance of the pixel sensing circuit. On a further hand, the fifth signal line 45 extending linearly has a short length, which can reduce the voltage drop of the fifth signal line 45 itself. Here, the lamination direction refers to the direction perpendicular to the bearing surface of the base substrate 0.

In this exemplary embodiment, as shown in FIG. 12 and FIG. 15, the orthographic projection of the fourth signal line 34 on the base substrate 0 may be between the orthographic projection of the first conductive portion 41 on the base substrate 0 and the orthographic projection of the third signal line 33 on the base substrate 0. In addition, the orthographic projection of the fourth signal line 34 on the base substrate 0 is not overlapped with the orthographic projection of the first conductive portion 41 on the base substrate 0.

As shown in FIG. 15 and FIG. 7, the first conductive portion 41 in FIG. 15 has a smaller area than the conductive portion 4 in FIG. 7, and the area of the first conductive portion 41 in FIG. 15 may be 60% of the area of the conductive portion 4 in FIG. 7.

The photodiode PD may be equivalent to an ideal light sensing element and an equivalent capacitor, and the first electrode (i.e., the first conductive portion 41) of the photodiode PD may be an electrode of the equivalent capacitor. A certain amount of charge may be accumulated in the photodiode PD under certain light illumination, and the charge Q accumulated in the photodiode PD may be represented as: Q=CU, where C is the capacitance value of the equivalent capacitor of the photodiode PD and the voltage U is the variation of the potential of the node N during the reading phase. In theory, Q∝S under the same condition, where S is the area of the first conductive portion 41. The equivalent capacitance of the photodiode may be calculated according to the parallel plate model, and its capacitance value C satisfies $$C = \frac{\varepsilon_0 \varepsilon_r S}{d},$$

where $\varepsilon_0$ is a vacuum dielectric constant, $\varepsilon_r$ is a relative dielectric constant, and d is the distance between the two electrodes. On the premise that only the effect of S on C is considered, C∝S is satisfied. In combination with U=Q/C, Q∝S, and C∝S, it can be known that the area S of the first conductive portion 41 does not affect the voltage at the node N in the reading phase when other conditions remain unchanged.

Figure 19:
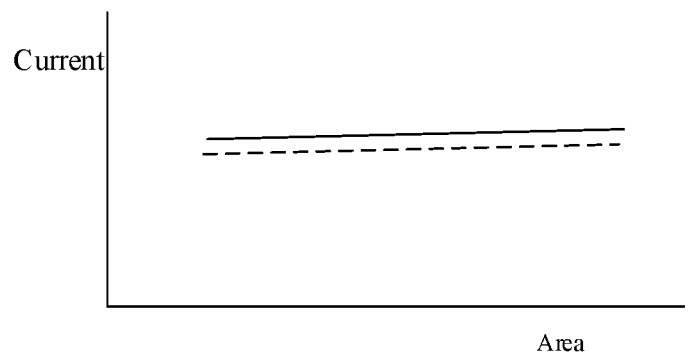
FIG. 19 shows a diagram showing a relation between an area of a first conductive portion and an output current of a driver transistor as practically measured.

FIG. 19 shows a diagram showing a relation between the area of the first conductive portion and the output current of the driver transistor as practically measured. This actual measurement is performed under light illumination of 0.5 nit and integral time of 100 ms (that is, the duration of the sensing phase). As shown in FIG. 19, the horizontal coordinate indicates the area of the first conductive portion, and the vertical coordinate is the output current of the driver transistor. The solid and dashed lines in FIG. 19 indicate the two samples, respectively. It can be seen from FIG. 19 that the area S of the first conductive portion 41 does not affect the output current of the driver transistor under a certain light intensity. That is, the area S of the first conductive portion 41 does not affect the voltage at the node N in the reading phase. Therefore, although the area of the first conductive portion 41 in this exemplary embodiment is reduced compared to that in the related art, the output current of the driver transistor DT in the reading phase is not affected.

Figure 13:
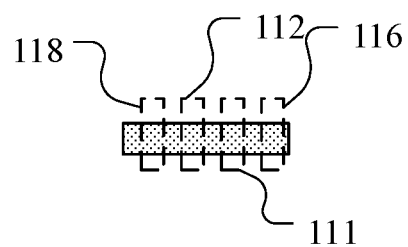
FIG. 13 shows a structural diagram of an active layer in FIG. 12.
Figure 13:
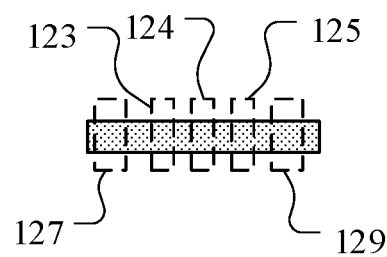

In this exemplary embodiment, the fingerprint identification module further includes an active layer. The active layer may be disposed between the base substrate and the first conductive layer. FIG. 13 is a structural diagram of the active layer in FIG. 12. As shown in FIG. 13, the active layer may include a first active portion 11 and a second active portion 12. The first active portion 11 and the second active portion 12 may both extend along the first direction X. An orthographic projection of the first active portion 11 on the base substrate 0 may be between the orthographic projection of the third signal line 33 on the base substrate 0 and the orthographic projection of the fourth signal line 34 on the base substrate 0, and a part of the first active portion 11 may be configured to form a channel region of the reset transistor T1. An orthographic projection of the second active portion 12 on the base substrate 0 may be between the orthographic projection of the third signal line 33 on the base substrate 0 and the orthographic projection of the fourth signal line 34 on the base substrate 0, and a part of the second active portion 12 may be configured to form channel regions of the switch transistor T2 and the driver transistor DT.

In addition, the orthographic projection of the first active portion 11 on the base substrate 0 may be between the orthographic projection of the first signal line 21 on the base substrate 0 and the orthographic projection of the second signal line 22 on the base substrate 0. The orthographic projection of the second active portion 12 on the base substrate 0 may be between the orthographic projection of the first active portion 11 on the base substrate 0 and the orthographic projection of the second signal line 22 on the base substrate 0. In this exemplary embodiment, as shown in FIG. 12 and FIG. 15, the orthographic projection of the fifth signal line 45 on the base substrate 0 may be between the orthographic projection of the third signal line 33 on the base substrate 0 and the orthographic projection of the fourth signal line 34 on the base substrate 0. Based on this configuration, the pixel sensing circuit can have a high degree of integration.

In this exemplary embodiment, as shown in FIG. 13, the first active portion may include a first sub-active portion 111 and a second sub-active portion 112. The first sub-active portion 111 may be configured to form a first channel region of the reset transistor T1, and the second sub-active portion 112 may be configured to form a second channel region of the reset transistor T1. The orthographic projection of the first sub-active portion 111 on the base substrate 0 and the orthographic projection of the second sub-active portion 112 on the base substrate 0 may be spaced apart along the first direction X.

As shown in FIG. 14, the first conductive layer further includes a second conductive portion 23 and a third conductive portion 24. The second conductive portion 23 is connected to the first signal line 21. An orthographic projection of the second conductive portion 23 on the base substrate 0 may cover the orthographic projection of the first sub-active portion 111 on the base substrate 0, and the second conductive portion 23 may be configured to form the first gate of the reset transistor T1. The third conductive portion 24 may be connected to the first signal line 21. An orthographic projection of the third conductive portion 24 on the base substrate 0 may cover the orthographic projection of the second sub-active portion 112 on the base substrate 0, and the third conductive portion 24 may be configured to form the second gate of the reset transistor T1. In this exemplary embodiment, the reset transistor T1 is of a double-gate structure, which can reduce the leakage current of the reset transistor T1.

In this exemplary embodiment, as shown in FIG. 13, the second active portion 12 may include a third sub-active portion 123, a fourth sub-active portion 124, and a fifth sub-active portion 125. The third sub-active portion 123 may be configured to form the first channel region of the switch transistor T2, the fourth sub-active portion 124 may be configured to form the second channel region of the switch transistor T2, and the fifth sub-active portion 125 may be configured to form the channel region of the driver transistor DT. An orthographic projection of the third sub-active portion 123 on the base substrate 0, an orthographic projection of the fourth sub-active portion 124 on the base substrate 0 and an orthographic projection of the fifth sub-active portion 125 on the base substrate 0 may be sequentially spaced apart along the first direction X, and the orthographic projection of the fifth sub-active portion 125 on the base substrate 0 may be between the orthographic projection of the fourth signal line 34 on the base substrate 0 and the orthographic projection of the fourth sub-active portion 124 on the base substrate 0.

As shown in FIG. 14, the first conductive layer includes a fourth conductive portion 25, a fifth conductive portion 26, and a sixth conductive portion 27. The fourth conductive portion 25 may be connected to the second signal line 22, an orthographic projection of the fourth conductive portion 25 on the base substrate 0 may cover the orthographic projection of the third sub-active portion 123 on the base substrate 0, and the fourth conductive portion 25 may be configured to form the first gate of the switch transistor T2. The fifth conductive portion 26 may be connected to the second signal line 22, an orthographic projection of the fifth conductive portion 26 on the base substrate 0 may cover the orthographic projection of the fourth sub-active portion 124 on the base substrate 0, and the fifth conductive portion 26 may be configured to form the second gate of the switch transistor T2. An orthographic projection of the sixth conductive portion 27 on the base substrate 0 may cover the orthographic projection of the fifth sub-active portion 125 on the base substrate 0, and the sixth conductive portion 27 may be configured to form the gate of the driver transistor DT.

In this exemplary embodiment, the area of the first conductive portion 41 may be 13 to 16 times, for example 13 times, 14 times, 15 times, or 16 times, the area of the sixth conductive portion 27.

In this exemplary embodiment, as shown in FIG. 12 and FIG. 13, the first active portion may further include a sixth sub-active portion 116. An orthographic projection of the sixth sub-active portion 116 on the base substrate 0 is on a side, distal from the orthographic projection of the second sub-active portion 112 on the base substrate 0, of the orthographic projection of the first sub-active portion 111 on the base substrate 0. The third conductive layer may further include a seventh conductive portion 37. An orthographic projection of the seventh conductive portion 37 on the base substrate 0 may be between the orthographic projection of the third signal line 33 on the base substrate 0 and the orthographic projection of the fourth signal line 34 on the base substrate 0, and the seventh conductive portion 37 may be connected to the sixth conductive portion 27 through the via hole 71 and connected to the sixth sub-active portion 116 through the via hole 72, thereby connecting the first electrode of the reset transistor T1 and the gate of the driver transistor DT.

In this exemplary embodiment, as shown in FIG. 13, the second active portion may further include a seventh sub-active portion 127. An orthographic projection of the seventh sub-active portion 127 on the base substrate 0 is on a side, distal from the orthographic projection of the fourth sub-active portion 124 on the base substrate 0, of the orthographic projection of the third sub-active portion 123 on the base substrate 0. As shown in FIG. 15, the third conductive layer may further include an eighth conductive portion 38. An orthographic projection of the eighth conductive portion 38 on the base substrate 0 may at least partially overlap with the orthographic projection of the seventh sub-active portion 127 on the base substrate 0, and the eighth conductive portion 38 may be connected to the seventh sub-active portion 127 through the via hole 73. The fifth signal line 45 may be connected to the eighth conductive portion 38 through the via hole 74, such that the read signal terminal Read is connected to the second electrode of the switch transistor T2.

It should be understood that the fifth signal line 45 may also be directly connected to the seventh sub-active portion 127 through one via hole in other exemplary embodiments. Compared to the direct connection between the fifth signal line 45 and the seventh sub-active portion 127 through one via hole, in this exemplary embodiment, the seventh sub-active portion 127 in the active layer and the fifth signal line 45 in the second conductive layer is connected through the eighth conductive portion 38 in the third conductive layer and the via hole 73 and the via hole 74 are set to have a small depth, thereby increasing the yield of the connection through via holes.

As shown in FIG. 13, the first active portion may further include an eighth sub-active portion 118. An orthographic projection of the eighth sub-active portion 118 on the base substrate 0 is on a side, distal from the orthographic projection of the first sub-active portion on the base substrate 0, of the orthographic projection of the second sub-active portion 112 on the base substrate 0. The third signal line 33 may be connected to the eighth sub-active portion 118 through the via hole 75, so as to connect the initial signal terminal and the second electrode of the reset transistor in FIG. 1. The second active portion may further include a ninth sub-active portion 129. An orthographic projection of the ninth sub-active portion 129 on the base substrate 0 may be on a side, distal from the orthographic projection of the fourth sub-active portion 124 on the base substrate 0, of the orthographic projection of the fifth sub-active portion 125 on the base substrate 0. The fourth signal line 34 may be connected to the ninth sub-active portion 129 through the via hole 76, to connect the second electrode of the driver transistor DT and the first power supply terminal VDD in FIG. 1.

Figure 17:
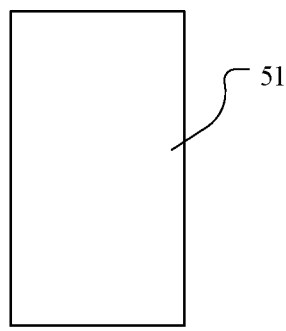
FIG. 17 shows a structural diagram of a fourth conductive layer in FIG. 12.
Figure 18:
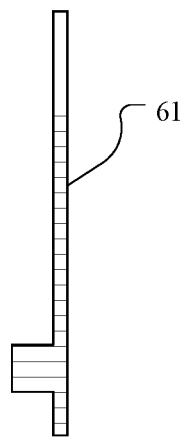
FIG. 18 shows a structural diagram of a fifth conductive layer in FIG. 12.

In this exemplary embodiment, as shown in FIG. 12, the fingerprint identification module may further include a fourth conductive layer and a fifth conductive layer. The fourth conductive layer is disposed on a side, distal from the base substrate, of the second conductive layer, and the fifth conductive layer is disposed on a side, distal from the base substrate, of the fourth conductive layer. As shown in FIG. 17 and FIG. 18, FIG. 17 shows the structural diagram of the fourth conductive layer in FIG. 12. A shown in FIG. 17, the fourth conductive layer may further include a ninth conductive portion 51. The orthographic projection of the ninth conductive portion 51 on the base substrate 0 at least partially overlaps with the orthographic projection of the first conductive portion 41 on the base substrate 0, and the ninth conductive portion 51 may be configured to form the second electrode of the photodiode PD. As shown in FIG. 12, the ninth conductive portion 51 may be connected to the seventh conductive portion 37 through the via hole 78, so as to connect the first electrode of the photodiode PD and the gate of the driver transistor DT.

FIG. 18 shows the structural diagram of the fifth conductive layer in FIG. 12. As shown in FIG. 18, the fifth conductive layer may include a sixth signal line 61. The orthographic projection of the sixth signal line 61 on the base substrate 0 is on a side, distal from the orthographic projection of the fourth signal line 34 on the base substrate 0, of the orthographic projection of the first conductive portion 41 on the base substrate 0, and the sixth signal line 61 may be configured to form the bias voltage terminal Vbias in FIG. 1. The sixth signal line 61 may be connected to the ninth conductive portion 51 through the via hole 77, so as to connect the bias voltage terminal Vbias and the second electrode of the photodiode PD.

It should be understood that the pixel sensing circuit in the fingerprint identification module according to other exemplary embodiments may also be of other structures. For example, the reset transistor, the switch transistor, and the driver transistor may all be P-type transistors, and for another example, the pixel sensing circuit may be an internal compensation circuit.

As shown in FIG. 12, in the fingerprint identification module, a blank area may be provided between the reset transistor T1 and the switch transistor T2 in the second direction Y, and other electric components may be integrated in the blank area. For example, when the pixel sensing circuit is an internal compensation circuit, the pixel sensing circuit includes more transistors, and the extra transistors may be provided in the blank area.

Figure 20:
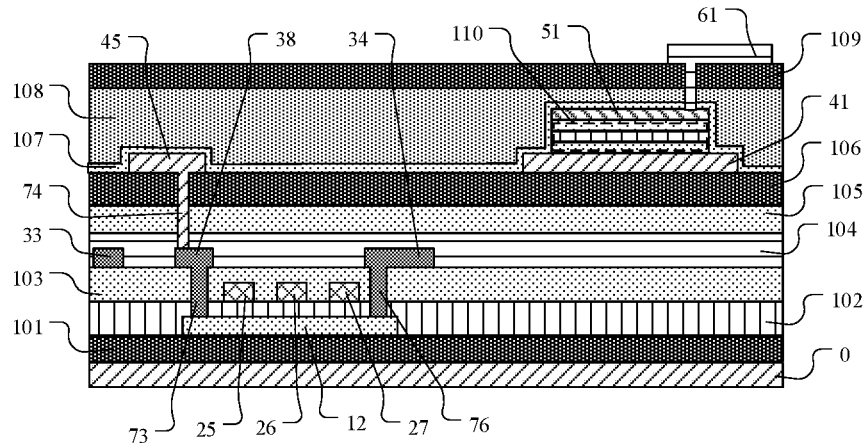
FIG. 20 shows a sectional view along a dashed line AA in FIG. 12.

In this exemplary embodiment, FIG. 20 shows a sectional view along the dashed line AA in FIG. 12. The fingerprint identification module may further include a buffer layer 101, an insulating layer 102, a dielectric layer 103, a passivation layer 104, a planarization layer 105, a passivation layer 106, a protective layer 107, a planarization layer 108, a passivation layer 109, and an optoelectronic functional layer 110. The base substrate 0, the buffer layer 101, the active layer, the insulating layer 102, the first conductive layer, the dielectric layer 103, the third conductive layer, the passivation layer 104, the planarization layer 105, the passivation layer 106, the second conductive layer, the optoelectronic function layer 110, the fourth conductive layer, the protective layer 107, the planarization layer 108, the passivation layer 109, and the fifth conductive layer are laminated sequentially. The photovoltaic functional layer 110 may be configured to form a photodiode PD, and may include a PIN laminated structure.

In this exemplary embodiment, the material of the protective layer, the dielectric layer, and the passivation layer may be an inorganic material or an organic material. The inorganic material may include at least one of silicon nitride, silicon oxide, silicon oxynitride, or a combination thereof. The organic material may include transparent polyimide (CPI), polyimide (PI), polyethylene terephthalate (PET), polyethylene naphthalate (PEN), and other materials. The material of the conductive layer may be at least one of copper, molybdenum, titanium, aluminum, nickel, silver, and indium tin oxide (ITO), or a combination thereof, or may be an alloy of the aforesaid materials. Alternatively, the conductive layer may be of a laminated structure, such as a triple laminated layer of titanium, aluminum and titanium. The buffer layer may be made of an inorganic material, which may for example include at least one of silicon nitride, silicon oxide, silicon oxynitride, or a combination thereof. The material of the flattening layer may be an organic material, which may be, for example, transparent polyimide (CPI), polyimide (PI), polyethylene terephthalate (PET), polyethylene naphthalate (PEN), silicon-glass bonding structure (SOG), or other materials. The material of the insulating layer may be an inorganic material, which may, for example, include at least one of silicon nitride, silicon oxide, silicon oxynitride, or a combination thereof. The active layer may be made from a low-temperature polycrystalline silicon material or an indium gallium zinc oxide material. The fourth conductive layer may be made of an indium tin oxide (ITO) material.

Figure 21:
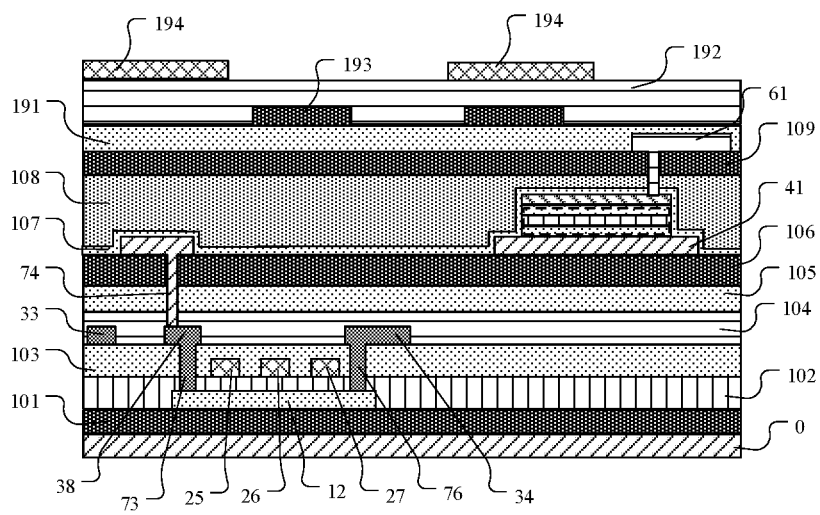
FIG. 21 shows a sectional view of a fingerprint identification module according to another exemplary embodiment of the present disclosure.

FIG. 21 shows a sectional view of a fingerprint identification module according to another exemplary embodiment of the present disclosure. The fingerprint identification module may further include a passivation layer 191 disposed on a side of the fifth conductive layer distal from the base substrate, a light shielding layer 193 disposed on a side of the passivation layer 191 distal from the base substrate, an insulating layer 192 disposed on a side of the light shielding layer 193 distal from the base substrate, and a transparent conductive layer 194 disposed on a side of the insulating layer 192 distal from the base substrate. The light shielding layer 193 may be configured to shield part of the plurality of photodiodes in the fingerprint identification module.

An exemplary embodiment further provides a display panel. The display panel includes a display substrate and any of the fingerprint identification modules described the foregoing exemplary embodiment. The fingerprint identification module is disposed at a side of the display substrate.

Figure 22:
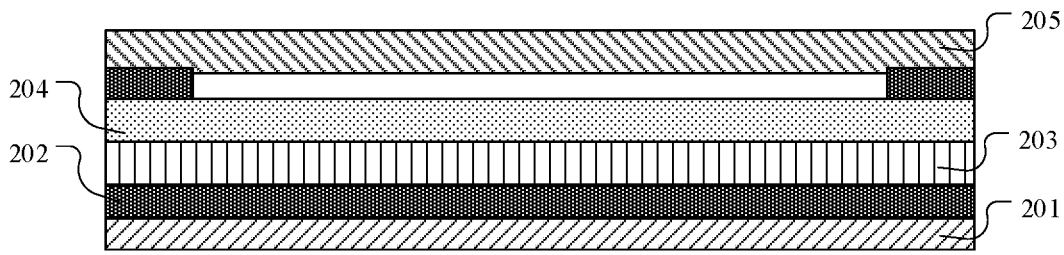
FIG. 22 shows a schematic structural diagram of a display panel according to an exemplary embodiment of the present disclosure.

FIG. 22 shows a schematic structural diagram of a display panel according to an exemplary embodiment of the present disclosure. As shown in FIG. 22, the display panel may include a base 201, a filter module 203, a collimating layer 204, and a display substrate 205. The fingerprint identification module 202 is disposed on a side of the base 201; the filter module 203 is disposed on a side of the fingerprint identification module 202 distal from the base 201; the collimating layer 204 is disposed on a side of the filter module 203 distal from the base; and the display substrate 205 is disposed on a side of the collimating layer 204 distal from the base 201. An air gap may exist between the display substrate 205 and the collimating layer 204. Here, the display substrate 205 may be an organic light-emitting diode (OLED) substrate.

Figure 23:
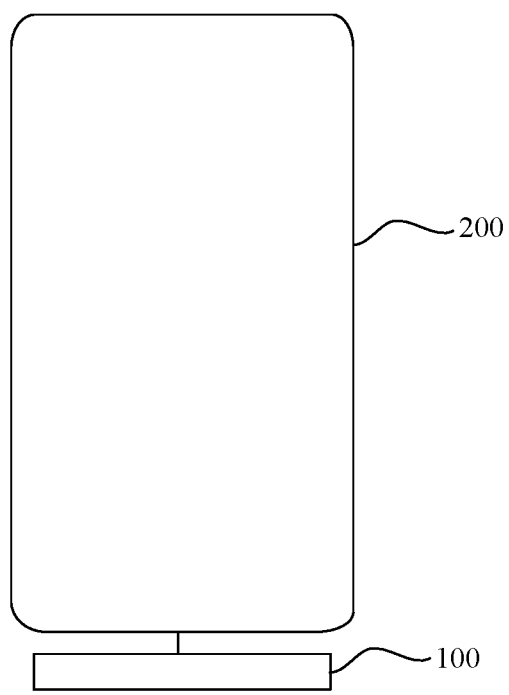
FIG. 23 shows a schematic structural diagram of a display device according to an exemplary embodiment of the present disclosure

FIG. 23 is a schematic structural diagram of a display device according to an exemplary embodiment of the present disclosure. As shown in FIG. 23, the display device may include a power supply component 100 and a display panel 200 connected to the power supply component 100. The power supply component 100 is configured to supply power to the display panel. The display panel 200 may be the display panel in the aforesaid embodiment. The structure of the display panel 200 has been described in detail above, and is not repeated here.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

What is claimed is:

1. A fingerprint identification module, comprising: a pixel sensing circuit, the pixel sensing circuit comprising a driver transistor, a reset transistor, a switch transistor and a photodiode, wherein a first electrode of the reset transistor and a first electrode of the photodiode are both connected to a gate of the driver transistor, and a first electrode of the switch transistor is connected to a first electrode of the driver transistor; the fingerprint identification module further comprising a base substrate, a first conductive layer disposed on a side of the base substrate, and a second conductive layer disposed on a side, distal from the base substrate, of the first conductive layer, wherein
the first conductive layer comprises:
a first signal line, extending along a first direction and connected to a gate of the reset transistor; and
a second signal line, extending along the first direction and connected to a gate of the switch transistor, wherein the second signal line and the first signal line are spaced apart along a second direction, the second direction intersecting with the first direction; and
the second conductive layer comprises:
a first conductive portion, wherein the first conductive portion is configured to form the first electrode of the photodiode, an orthographic projection of the first conductive portion on the base substrate does not overlap with an orthographic projection of the first signal line on the base substrate and an orthographic projection of the second signal line on the base substrate, and the orthographic projection of the first conductive portion on the base substrate is between the orthographic projection of the first signal line on the base substrate and the orthographic projection of the second signal line on the base substrate,
wherein the fingerprint identification module further comprises: a third conductive layer disposed between the first conductive layer and the second conductive layer, wherein the third conductive layer comprises:
a third signal line, extending along the second direction and connected to a second electrode of the reset transistor; and
a fourth signal line, extending along the second direction and connected to a second electrode of the driver transistor;
wherein the second conductive layer further comprises:
a fifth signal line, extending along the second direction and connected to a second electrode of the switch transistor.

2. The fingerprint identification module according to claim 1, wherein an orthographic projection of the fourth signal line on the base substrate is between the orthographic projection of the first conductive portion on the base substrate and an orthographic projection of the third signal line on the base substrate.

3. The fingerprint identification module according to claim 2, wherein the orthographic projection of the fourth signal line on the base substrate does not overlap with the orthographic projection of the first conductive portion on the base substrate.

4. The fingerprint identification module according to claim 2, wherein an orthographic projection of the fifth signal line on the base substrate is between the orthographic projection of the third signal line on the base substrate and the orthographic projection of the fourth signal line on the base substrate.

5. The fingerprint identification module according to claim 2, further comprising: an active layer disposed between the base substrate and the first conductive layer, wherein the active layer comprises:
a first active portion, wherein an orthographic projection of the first active portion on the base substrate is between the orthographic projection of the third signal line on the base substrate and the orthographic projection of the fourth signal line on the base substrate, and a part of the first active portion is configured to form a channel region of the reset transistor; and
a second active portion, wherein an orthographic projection of the second active portion on the base substrate is between the orthographic projection of the third signal line on the base substrate and the orthographic projection of the fourth signal line on the base substrate, and a part of the second active portion is configured to form channel regions of the switch transistor and the driver transistor.

6. The fingerprint identification module according to claim 5, wherein
the orthographic projection of the first active portion on the base substrate is between the orthographic projection of the first signal line on the base substrate and the orthographic projection of the second signal line on the base substrate; and
the orthographic projection of the second active portion on the base substrate is between the orthographic projection of the first active portion on the base substrate and the orthographic projection of the second signal line on the base substrate.

7. The fingerprint identification module according to claim 5, wherein both the first active portion and the second active portion extend along the first direction.

8. The fingerprint identification module according to claim 5, wherein the first active portion comprises:
a first sub-active portion, configured to form a first channel region of the reset transistor; and a second sub-active portion, configured to form a second channel region of the reset transistor, wherein an orthographic projection of the first sub-active portion on the base substrate and an orthographic projection of the second sub-active portion on the base substrate are spaced apart along the first direction.

9. The fingerprint identification module according to claim 8, wherein the first conductive layer further comprises:

a second conductive portion, wherein the second conductive portion is connected to the first signal line, an orthographic projection of the second conductive portion on the base substrate covers the orthographic projection of the first sub-active portion on the base substrate, and the second conductive portion is configured to form a first gate of the reset transistor; and a third conductive portion, wherein the third conductive portion is connected to the first signal line, an orthographic projection of the third conductive portion on the base substrate covers the orthographic projection of the second sub-active portion on the base substrate, and the third conductive portion is configured to form a second gate of the reset transistor.

10. The fingerprint identification module according to claim 5, wherein the second active portion comprises:

a third sub-active portion, configured to form a first channel region of the switch transistor;

a fourth sub-active portion, configured to form a second channel region of the switch transistor; and a fifth sub-active portion, configured to form the channel region of the driver transistor, wherein an orthographic projection of the third sub-active portion on the base substrate, an orthographic projection of the fourth sub-active portion on the base substrate and an orthographic projection of the fifth sub-active portion on the base substrate are sequentially spaced apart along the first direction; and the orthographic projection of the fifth sub-active portion on the base substrate is between the orthographic projection of the fourth signal line on the base substrate and the orthographic projection of the fourth sub-active portion on the base substrate.

11. The fingerprint identification module according to claim 10, wherein the first conductive layer further comprises:

a fourth conductive portion, wherein the fourth conductive portion is connected to the second signal line, an orthographic projection of the fourth conductive portion on the base substrate covers the orthographic projection of the third sub-active portion on the base substrate, and the fourth conductive portion is configured to form a first gate of the switch transistor; and a fifth conductive portion, wherein the fifth conductive portion is connected to the second signal line, an orthographic projection of the fifth conductive portion on the base substrate covers the orthographic projection of the fourth sub-active portion on the base substrate, and the fifth conductive portion is configured to form a second gate of the switch transistor; and a sixth conductive portion, wherein an orthographic projection of the sixth conductive portion on the base substrate covers the orthographic projection of the fifth sub-active portion on the base substrate, and the sixth conductive portion is configured to form the gate of the driver transistor.

12. The fingerprint identification module according to claim 11, wherein the first active portion further comprises:

a sixth sub-active portion, wherein an orthographic projection of the sixth sub-active portion on the base substrate is on a side, distal from the orthographic projection of the second sub-active portion on the base substrate, of the orthographic projection of the first sub-active portion on the base substrate;

wherein the second conductive layer further comprises:

a seventh conductive portion, wherein an orthographic projection of the seventh conductive portion on the base substrate is between the orthographic projection of the third signal line on the base substrate and the orthographic projection of the fourth signal line on the base substrate; and the seventh conductive portion is connected to the sixth conductive portion and the sixth sub-active portion through via holes, respectively.

13. The fingerprint identification module according to claim 12, wherein the second active portion further comprises:

a seventh sub-active portion, wherein an orthographic projection of the seventh sub-active portion on the base substrate is on a side, distal from the orthographic projection of the fourth sub-active portion on the base substrate, of the orthographic projection of the third sub-active portion on the base substrate;

wherein the second conductive layer further comprises:

an eighth conductive portion, wherein an orthographic projection of the eighth conductive portion on the base substrate at least partially overlaps with the orthographic projection of the seventh sub-active portion on the base substrate, and the eighth conductive portion is connected to the seventh sub-active portion through a via hole;

wherein the fifth signal line is connected to the eighth conductive portion through a via hole.

14. The fingerprint identification module according to claim 11, wherein an area of the orthographic projection of the first conductive portion on the base substrate is 13-16 times an area of the orthographic projection of the sixth conductive portion on the base substrate.

15. The fingerprint identification module according to claim 10, wherein the first active portion further comprises an eighth sub-active portion, wherein an orthographic projection of the eighth sub-active portion on the base substrate is on a side, distal from the orthographic projection of the first sub-active portion on the base substrate, of the orthographic projection of the second sub-active portion on the base substrate, and the third signal line is connected to the eighth sub-active portion through a via hole; and the second active portion further comprises a ninth sub-active portion, wherein an orthographic projection of the ninth sub-active portion on the base substrate is on a side, distal from the orthographic projection of the fourth sub-active portion on the base substrate, of the orthographic projection of the fifth sub-active portion on the base substrate, and the fourth signal line is connected to the ninth sub-active portion through a via hole.

16. The fingerprint identification module according to claim 1, further comprising: a fourth conductive layer and a fifth conductive layer, the fourth conductive layer being disposed on a side of the second conductive layer distal from the base substrate, and the fifth conductive layer being disposed on a side of the fourth conductive layer distal from the base substrate, wherein the fourth conductive layer further comprises a ninth conductive portion, wherein an orthographic projection of the ninth conductive portion on the base substrate at least partially overlaps with the orthographic projection of the first conductive portion on the base substrate, and the ninth conductive portion is configured to form a second electrode of the photodiode; and the fifth conductive layer comprises a sixth signal line, wherein an orthographic projection of the sixth signal line on the base substrate is on a side, distal from the orthographic projection of the fourth signal line on the base substrate, of the orthographic projection of the first conductive portion on the base substrate, and the sixth signal line is connected to the ninth conductive portion through a via hole.

17. A display panel, comprising: a display substrate, and a fingerprint identification module disposed on a side of the display substrate, wherein the fingerprint identification module comprises a pixel sensing circuit, the pixel sensing circuit comprising a driver transistor, a reset transistor, a switch transistor and a photodiode, wherein a first electrode of the reset transistor and a first electrode of the photodiode are both connected to a gate of the driver transistor, and a first electrode of the switch transistor is connected to a first electrode of the driver transistor; and the fingerprint identification module further comprises a base substrate, a first conductive layer disposed on a side of the base substrate, and a second conductive layer disposed on a side, distal from the base substrate, of the first conductive layer, wherein the first conductive layer comprises:

a first signal line, extending along a first direction and connected to a gate of the reset transistor; and a second signal line, extending along the first direction and connected to a gate of the switch transistor, wherein the second signal line and the first signal line are spaced apart along a second direction, the second direction intersecting with the first direction; and the second conductive layer comprises:

a first conductive portion, wherein the first conductive portion is configured to form the first electrode of the photodiode, an orthographic projection of the first conductive portion on the base substrate does not overlap with an orthographic projection of the first signal line on the base substrate and an orthographic projection of the second signal line on the base substrate, and the orthographic projection of the first conductive portion on the base substrate is between the orthographic projection of the first signal line on the base substrate and the orthographic projection of the second signal line on the base substrate, wherein the fingerprint identification module further comprises: a third conductive layer disposed between the first conductive layer and the second conductive layer, wherein the third conductive layer comprises:

a third signal line, extending along the second direction and connected to a second electrode of the reset transistor; and a fourth signal line, extending along the second direction and connected to a second electrode of the driver transistor;

wherein the second conductive layer further comprises:

a fifth signal line, extending along the second direction and connected to a second electrode of the switch transistor.

18. The display panel according to claim 17, further comprising:

a base, wherein the fingerprint identification module is disposed on a side of the base;

a filter module, disposed on a side, distal from the base, of the fingerprint identification module; and a collimating layer, disposed on a side, distal from the base, of the filter module;

wherein the display substrate is disposed on a side, distal from the base, of the collimating layer.

19. A display device, comprising: a power supply component and a display panel, wherein the power supply component is configured to supply power to the display panel, and the display panel comprises a display substrate, and a fingerprint identification module disposed on a side of the display substrate, wherein the fingerprint identification module comprises a pixel sensing circuit, the pixel sensing circuit comprising a driver transistor, a reset transistor, a switch transistor and a photodiode, wherein a first electrode of the reset transistor and a first electrode of the photodiode are both connected to a gate of the driver transistor, and a first electrode of the switch transistor is connected to a first electrode of the driver transistor; and the fingerprint identification module further comprises a base substrate, a first conductive layer disposed on a side of the base substrate, and a second conductive layer disposed on a side, distal from the base substrate, of the first conductive layer, wherein the first conductive layer comprises:

a first signal line, extending along a first direction and connected to a gate of the reset transistor; and a second signal line, extending along the first direction and connected to a gate of the switch transistor, wherein the second signal line and the first signal line are spaced apart along a second direction, the second direction intersecting with the first direction; and the second conductive layer comprises:

a first conductive portion, wherein the first conductive portion is configured to form the first electrode of the photodiode, an orthographic projection of the first conductive portion on the base substrate does not overlap with an orthographic projection of the first signal line on the base substrate and an orthographic projection of the second signal line on the base substrate, and the orthographic projection of the first conductive portion on the base substrate is between the orthographic projection of the first signal line on the base substrate and the orthographic projection of the second signal line on the base substrate, wherein the fingerprint identification module further comprises: a third conductive layer disposed between the first conductive layer and the second conductive layer, wherein the third conductive layer comprises:

a third signal line, extending along the second direction and connected to a second electrode of the reset transistor; and a fourth signal line, extending along the second direction and connected to a second electrode of the driver transistor;

wherein the second conductive layer further comprises:

a fifth signal line, extending along the second direction and connected to a second electrode of the switch transistor.

* * * * *